April 11, 1933.  G. A. WETTENGEL  1,903,584
AUTOMOBILE THEFT DEVICE
Filed June 1, 1927  2 Sheets-Sheet 1
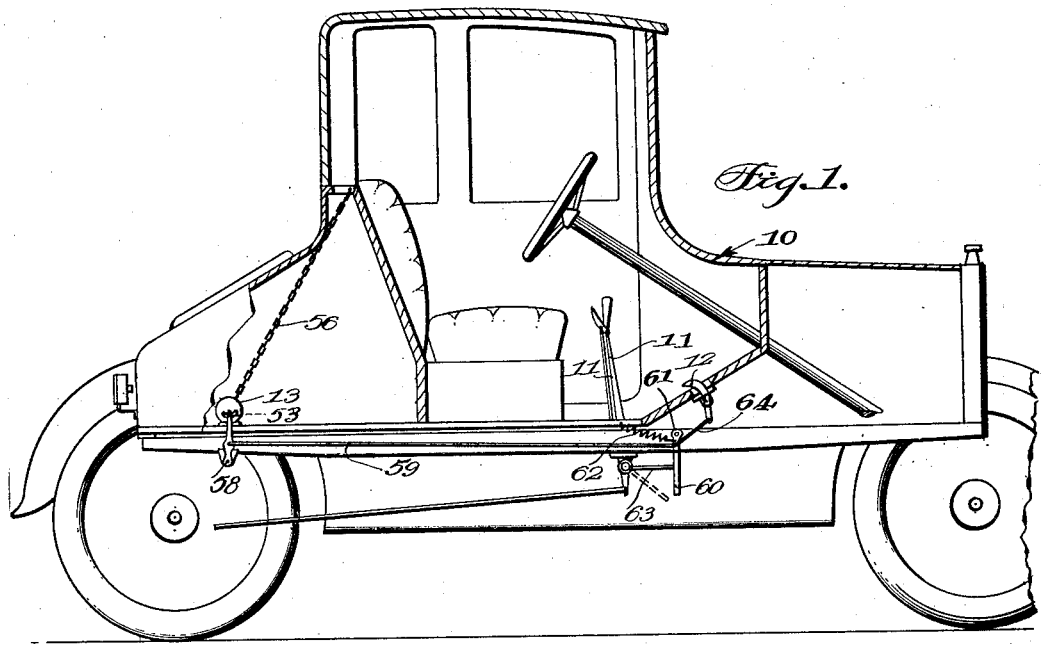
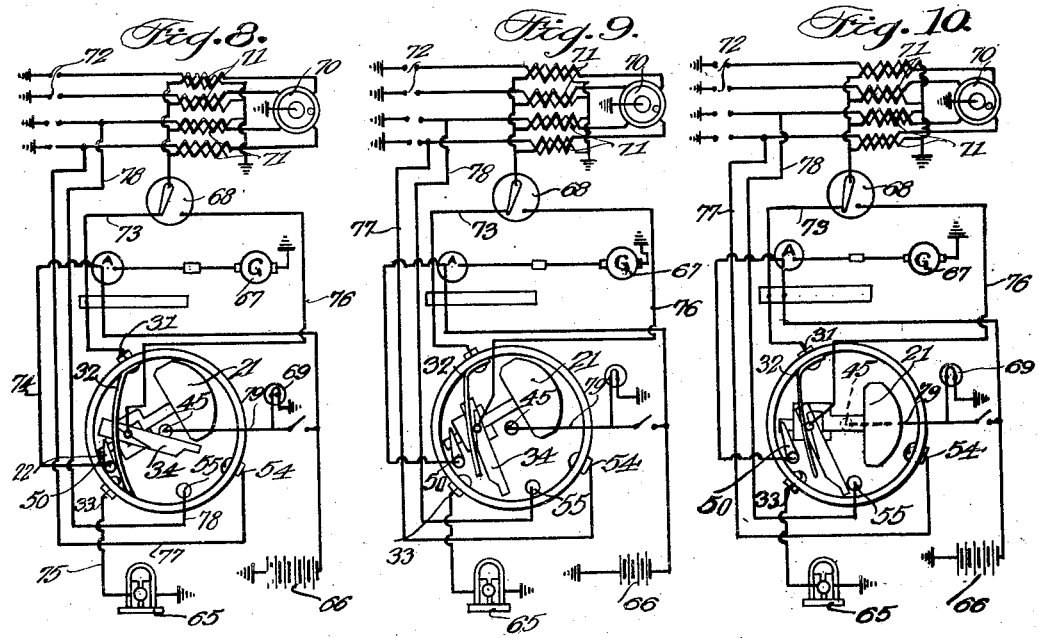
INVENTOR
GEORGE A. WETTENGEL
BY *Munn & Co.*
ATTORNEYS.

April 11, 1933. G. A. WETTENGEL 1,903,584
AUTOMOBILE THEFT DEVICE
Filed June 1, 1927 2 Sheets-Sheet 2
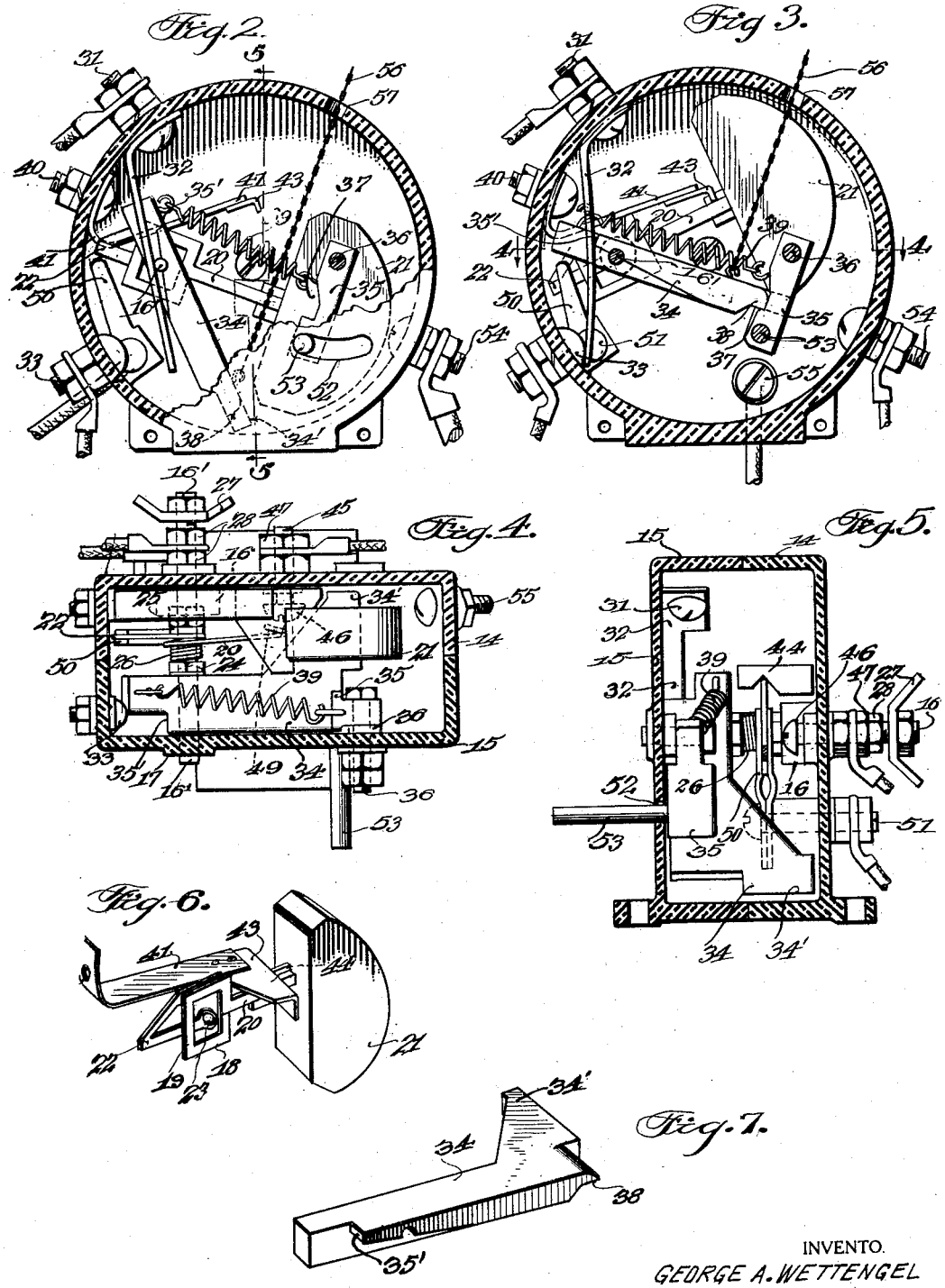
INVENTO.
GEORGE A. WETTENGEL
BY
ATTORNEYS Patented Apr. 11, 1933

1,903,584

UNITED STATES PATENT OFFICE

GEORGE A. WETTENGEL, OF ST. LOUIS, MISSOURI

AUTOMOBILE THEFT DEVICE

Application filed June 1, 1927. Serial No. 195,837

This invention relates to a device to prevent theft of automobiles.

An object of the invention is to provide a device for use on an automobile which may be set or operated by the driver of the automobile, unnoticed by others, to render the motive mechanism of the automobile inoperative if driven by an unauthorized person an approximate distance.

Another object of the invention is to provide means for producing signals to indicate the automobile is being driven by an unauthorized person previous to the time the motive mechanism of the automobile becomes inoperative.

It is also an object of the invention that means be provided whereby the motive mechanism of the automobile will operate in an irregular manner when being driven by a thief or unauthorized person and previous to the time when the motive mechanism is rendered inoperative.

Other objects, and objects relating to details of construction combination and arrangement of parts will hereinafter appear in the detail description to follow.

The invention is illustrated by way of example in the accompanying drawings, in which:

Figure 1 is a view in side elevation of an automobile, with parts broken away to illustrate the application of the present invention.

Figures 2 and 3 are schematic views in side elevation illustrating the automatic operating mechanism of the invention during different operations thereof.

Figure 4 is a sectional view taken substantially on the line 4—4 of Figure 3.

Figure 5 is a view similar to Figure 4 but taken on the line 5—5 of Figure 2.

Figures 6 and 7 are detail views of the control weight and associated pivot means, and the supporting lever for the weight respectively, and, Figures 8, 9 and 10 are diagrammatic views showing the present device associated with the ignition system of a motor vehicle and different operations thereof.

Referring to the drawings more specifically, in Figure 1, 10 indicates generally an automobile of conventional type. At 11 I have indicated a hand lever which is commonly employed for applying emergency brakes, and at 12 I have shown an accelerator pedal commonly employed on automobiles. At 13, there is indicated the automatic operating unit of this invention.

The unit 13 is specifically shown in Figures 2 to 7 inclusive. Referring to the last named figures of the drawings 14 and 15 indicate two casing sections in which the automatic operating mechanism is enclosed.

The casing section 14 is formed with a boss 16 through which there is extended a bolt 16'. The bolt 16' extends through a suitable opening in boss 16 and between the two casing sections. The bolt is free for longitudinal movement toward casing section 15 inwardly of an opening in the end wall of the casing section 15, the wall of the latter around the opening therein having an exteriorly arranged reenforcing boss 17. A flexible frame 18 is provided comprising a strip of thin steel 19 that terminates at one end in a flexible arm 20 which supports a weight 21. The other end of strip 19 terminates in an outwardly extending pointed portion 22 which carries at its free end a hub 23 disposed within the frame as best shown in Figure 6. The bolt 16' is extended through the hub 23. The bolt 16' has threaded thereon adjacent one side of hub 23, a nut 24, and in abutting relation with the other side of said hub, a nut 25. Between the nut 24 and hub 23 there is interposed a coil spring 26. The nut 25 is countersunk in boss 16 as indicated in Figure 4 to prevent said nut from turning with bolt 16'. As seen in Figure 4 the bolt 16' extends considerably from the casing section 14, and its end extending from said casing section has removably secured thereto a wing nut 27. The bolt is threaded between the wing nut 27 and nut 24. Lock nuts 28 upon the bolt 16' provide means for locking said bolt against turning.

Casing section 15 carries a contact post 31 for securing one end of a spring finger 32. The free end of the spring finger 32 engages normally a binding post 33 carried by the casing section 15, when the arm 20 and the weight 21 are moved to raised position, as shown to advantage in Figure 3.

The weight 21 is normally in the position shown in Figures 3 and 8 and so held by a finger or projection 34' on a lever 34 pivoted upon bolt 16' and held in position for supporting the weight 21 by a latch 35. Latch 35 is pivoted to casing section 15 as at 36. The latch 35 is provided with a notch 37 in which the reduced end 38 of the lever 34 may seat. A retractile spring 39 extends between the latch 35 and lever 34 and is preferably connected to said members in the manner shown. The lever 34 adjacent its pivoted end is provided with a shoulder 35' which acts to force the spring finger 32 against the contact post 33, when the latch lever 34 is moved to raised position along with the arm 20 and the weight 21, substantially as is shown in Figure 3. It is to be noted that the lever 34 and the latch 35 are made of a non-conducting material, such as fiber.

The casing sections 14 and 15 are of a suitable insulating material. The casing sections carry a number of binding posts as is seen from the drawings. The post 40 serves as an anchor for a spring finger 41 which has secured to its free end a plate member 43. This plate member 43 is provided with a notch 44 adapted for receiving a vertically arranged knife edge member 20' on the arm 20 of frame 18, whereby sidewise vibration of the arm 20 will be permitted when the same is in its uppermost position of operation, while the upward movement of the arm 20 is cushioned by the spring finger 41 as the knife edge 20' moves into engagement with the notch 44 in the blade member 43. The post 45 carried by the casing section 14 has a head 46 which may be adjusted with respect to the arm 20 of member 18. The post 45 carries lock nuts 47 for securing the same against turning. The arm 20 of member 18 has one end of a spring contact finger 49 secured thereto, the free end of said finger 49 being adapted to normally stand away from the arm 20, as shown to advantage in Figure 4, for cooperative engagement with the post 45 during certain movements of the arm 20 as will be hereinafter more fully explained. This contact finger 49 is of a sufficient area that it will intermittently contact the post head 46 throughout a downward swinging movement of the arm 20 under the influence of the weight 21 and by reason of the vibratory motion of the arm and weight, due to the unauthorized travel of the automobile on which the device is mounted. The downward movement of the arm 20 is effectively checked by the friction between the same and the abutted end of the coil spring 26, the tension of the latter being varied by the vibratory or flexing movement of the arm 20 due to the jarring and jolting movements of the automobile when in motion.

The casing section 14 also carries a pair of prongs 50 between which the pointed end 22 of member 18 engages when the weight 21 is in its elevated position as seen in Figures 3, 8 and 9. The prongs 50 are electrically connected to post 51.

The casing section 15 is provided with an arcuate slot 52 in which there is movable a pin 53 carried by the latch 35.

Casing section 14 carries binding post 54 and binding post 55 which are so arranged that the weight 21 comes in close relation thereto when in its lowered position as illustrated in Figures 2 and 10.

It should be here noted that the device 13 heretofore described may be mounted upon the body or frame of an automobile preferably in the position shown in Figure 1. A chain 56, intended only for resetting the weighted arm 20 in its normally raised and inoperative position, is extended downwardly from the seat of the automobile as shown and connected to the latching lever as shown in Figures 2 and 3; the end portion of which lever 34 engages in the notch 37 of the latch plate 35 to secure the arm 20 in such position. The chain extends through a suitable opening in the casing of the device 13 as indicated at 57. The chain 56 is of sufficient length as to allow the latching lever 34 to assume the position shown in Fig. 2 when the latch plate 35 is retracted. An arm 58 is suitably pivoted to the base of device 13 or pivoted upon the frame or body of the associated automobile. One end of arm 58 has a pivot connection with pin 53 and one end of a cable or rod 59 is connected to the arm 58 at a point intermediate its length. The remaining end of cable 59 is connected to an arm 60, said arm 60 having one end thereof pivotally connected to the frame of the automobile as at 61. A spring 62 urges arm 60 to swing rearwardly. The lower end of arm 60 engages the free end of a finger 63 extending radially from the brake shaft controlled by the brake lever 11. The arm 60 also may be connected to the accelerator pedal 12 by a suitable link or cable 64.

Now referring to Figures 8 to 10 more specifically, it will be noted that the parts of the device 13 shown in these figures have been given reference characters corresponding to the description heretofore given said parts. The purpose of Figures 8 to 10 inclusive is to illustrate how the device may be associated with the well known type of ignition used in automobiles of Ford manufacture and the purposes of this invention accomplished. In these figures of the drawings 65 indicates a magneto, 66 a battery, 68 an ignition switch, 67 a direct current generator, 69 a stop light, 70 a timer, and 71 the primary and secondary ignition coils. The gaps 72 indicate spark plug gaps. It will be noted that the ignition system is provided with the customary ground connections for completing the different circuits. In connecting device 13 with the ignition system shown, post 31 is connected to one side of switch 68 as indicated by the lead 73, prongs 50 are connected to battery 66 and generator 67 as indicated by lead 74, post 33 is connected to the magneto 65 as indicated by lead 75, pivot bolt 16' is connected to the remaining side of switch 68 as indicated by lead 76, posts 54 and 55 are each connected to a secondary winding or circuit, as indicated by leads 77 and 78 respectively, and post 45 connected to the stop light 69 as indicated by lead 79.

In the use of the present invention, if the weight 21 has been lifted by the chain 56 and supported in the position illustrated in Figures 3 and 8, and the switch 68 is in the position shown, current can proceed from magneto 65 through spring finger 32, lead 73 to the primary coils and timer of the ignition system and the engine operate in the usual manner. If the switch 68 is operated to engage its other contact, current from battery 66 may flow through prongs 50, members 18, pivot bolt 16', lead 76, switch 68, and through primary coils and timer of the ignition system. It is to be understood that the weight 21 will be sustained against operation from the cable or chain 56 as long as the automobile is being operated by a properly authorized person and the latter is without molestation and that the device in its entirety will be set for automatic operation by release of the cable or chain 56 and the weight 21 connected thereto.

Should the driver of the automobile be stopped by an unauthorized person or thief and commanded to leave the automobile, he can either step upon the accelerator pedal 12 to set the device 13 or set the brakes through hand lever 11 and accomplish the same result. In either case the arm 60 will be swung forwardly in an apparent manner and the arm 58 swung upon its pivot to operate the latch 35 for releasing the lever 34. With the lever 34 released the same will drop to the position illustrated in Figures 2, 9 and 10, and the free end of spring finger 32 will leave the post 33, thus breaking the circuit for ignition from the magneto 65 heretofore described, while the arm 20 will also be released to move downwardly under the influence of the weight 21 as required. The pressure of the spring 26 normally holds the weight 21 against free downward movement, but, as soon as vibration is set up due to the subsequent motion of the automobile by unauthorized operation, the arm 20 and the weight 21 will drop; the same being otherwise retarded against free dropping movement. Continued jars and jolts to the automobile will result in the intermittent relieving of the compression of the spring 26 on the arm 20 and the similar dropping movement of the latter and the weight 21. By increasing the normal tension of the spring 26 on the arm 20 by the tightening up of the wing nut 27, the greater will be the retarding action of the same on the arm and the longer time required for the final dropping movement of the latter. With the release of lever 34, the same assumes the position shown in Figures 9 and 10 and the spring finger 32 leaves contact post 33. The thief may start the engine from the battery 66 as a source of current for ignition, as current may flow from battery 66 through lead 74, pivot bolt 16', lead 76 and switch 68. The compression of the spring 26 can be adjusted by rotation of bolt 16' in the proper direction by the wing nut 27.

As the thief drives away with the automobile, vibration caused by the movement of the automobile will swing the weight laterally, and bring spring 49 into contact with post 45 and make a circuit through stop light 69, by way of the leads 79 extending between the post 45 and one side of the stop light 69. Whenever the spring finger 49 is vibrated into contact with the post 45, by the lateral oscillating movement of the arm 20 and weight 21, the circuit will be completed through the arm 20 either of the current sources 65 or 66 by way of the lead 74 therefrom to the binding post 51, the prongs 50, the arm 20, the spring finger 49, the binding post 45, the lead 79 to the stop light 69 and from thence to the ground and back to the grounded sides of the current sources. The weight 21 causes intermittent contact with post 45, due to the vibration now obtaining and consequently intermittently lights the stop light 69, and thus provides a signal that the car is being driven by an unauthorized person. The downward movement of the arm 20, in this instance, is retarded by means of the intermittent release and take up of the tension of the spring 26 under the sidewise vibratory movements of the arm 20, as will be obvious. The arc of swinging movement of the arm 20 in a downward direction, under the action of the weight 21 and with reference to the circuit contact 46 is such that the contact 49 will be intermittently maintained between the latter to cause the stop light 69 to flash throughout the entire period of movement of the arm and weight to lowermost position within the casing.

As the automobile proceeds, the weight 21 will gradually move downward under the vibratory effect aforesaid until contact between prongs 50 and member 18 is broken, when the ignition circuit will also be broken. However, before breaking the circuit between the prongs 50 and the member 18, the weight 21, in its initial downward movement, will first come close to posts 54 and 55 and, in doing so, will lessen the normal gap between the same and itself to almost actual contact therewith and thus form an easy path to the ground for the high tension ignition current through wires 77 and 78 and cause a missing of firing in two cylinders of the engine. As is apparent the contact or post 54 will be the first to establish a ground for the ignition current connected thereto. This will cause one cylinder of the engine to miss fire, and later with the weight 21 coming in close relation with contact or post 55, two cylinders will miss fire. When contact between the member 18 and prongs 50 is finally broken, after the substantial grounding of the contact posts 54 and 55, the engine will stop and the thief can be apprehended. When the weight 21 is cooperatively positioned relative to the posts 54 and 55, the ignition circuit of two cylinders of the engine will be shunted from the corresponding ignition devices thereof, by way of conductors 77 and 78 to posts 54 and 55 respectively, where the current will jump to or from the weight 21, as the case may be and pass thence to one or the other of the current sources 65 and 66 by way of the ground connections of the latter and of the leads from the ignition devices affected.

While I have shown and described the preferred form of my invention, it is to be understood that I am fully aware of the changes in the combination and general arrangement of parts constituting my invention may be made by those skilled in the art and like results produced without departing from my invention, as indicated by the appending claims.

It is to be noted that the dropping of the arm 20 and the weight 21 is permitted without any need for any previous disturbance of the chain 56, since the latter has sufficient slack in the same for the purpose, after it has been previously manipulated by the authorized operator of the automobile to restore the arm 20 and the latch 34 to normally raised position. Therefore, it is obvious that the only function of the chain 56 is to restore the device to normal position and until the latch member 34 is again released from the arm 20 from the actuating arms 58 and 63.

I claim:

1. The combination with an automobile having a high tension ignition circuit and a signal, a weighted member, means for pivotally supporting said weighted member for movement from a normal upper to a lower operative position and for allowing the same to vibrate at right angles to the plane of the first movement when away from its normal position, latch means for retaining said weighted member in its upper normal position, means for releasing said latch as an incident to the operation of some member involved in the conditioning of the automobile for movement, means whereby the primary of the ignition circuit of the automobile will be broken when said weighted member is released, a circuit including the signal means whereby the signal circuit may be intermittently established upon the lateral vibration of said weighted member, and means whereby the secondary of the ignition circuit will be grounded after the primary circuit has been opened and as the weighted member moves toward its lower position, and means for restoring said weighted member to an initial position.

2. The combination with an automobile having a high tension ignition circuit, a weighted member, means for pivotally supporting said weighted member for movement from a normal upper to a lower inoperative position and for allowing the same to vibrate when released from its normal position, means for releasably retaining the weighted member in its normal position, means for releasing the retaining means as an incident to the operation of some member involved in the conditioning of the automobile for movement, means whereby the primary of the ignition circuit of the automobile will be broken when said weighted member is released, means whereby the secondary of the ignition circuit will be grounded after the primary circuit has been opened and as the weighted member moves toward its lower position, and means for restoring said weighted member to initial position.

GEORGE A. WETTENGEL.